United States Patent
Wilkes et al.

(10) Patent No.: US 7,226,956 B2
(45) Date of Patent: Jun. 5, 2007

(54) LOW DENSITY POLYMERIC FOAM USING A THREE-POLYMER BLEND

(76) Inventors: Gary Richard Wilkes, 41 Knollwood Dr., Saratoga Springs, NY (US) 12866; James L. Zwynenburg, 3 Pheasant Walk, Queensbury, NY (US) 12804

( * ) Notice: Subject to any disclaimer, the term of this patent is extended or adjusted under 35 U.S.C. 154(b) by 272 days.

(21) Appl. No.: 10/880,973

(22) Filed: Jun. 30, 2004

(65) Prior Publication Data

US 2006/0100296 A1    May 11, 2006

(51) Int. Cl.
*C08L 63/00* (2006.01)
(52) U.S. Cl. ............... 521/134; 521/139; 521/147; 525/98; 525/191; 525/240
(58) Field of Classification Search ........ 521/134, 521/139, 147; 525/98, 191, 240
See application file for complete search history.

(56) References Cited

U.S. PATENT DOCUMENTS

| | | | |
|---|---|---|---|
| 5,698,144 A | 12/1997 | Wilkes et al. | |
| 5,895,790 A * | 4/1999 | Good | 521/47 |
| 6,069,183 A | 5/2000 | Wilkes et al. | |
| 6,114,025 A | 9/2000 | DeVaudreuil et al. | |
| 6,225,363 B1 | 5/2001 | Wilkes et al. | |
| 6,846,603 B2 | 1/2005 | Fujii et al. | |
| 6,875,485 B2 | 4/2005 | Kanai et al. | |
| 6,881,790 B1 | 4/2005 | Laurin et al. | |
| 6,946,495 B2 | 9/2005 | Zwynenburg et al. | |
| 7,022,449 B2 | 4/2006 | Sugahara et al. | |
| 7,026,436 B2 | 4/2006 | Kanakarajan | |

* cited by examiner

*Primary Examiner*—Terressa Boykin
(74) *Attorney, Agent, or Firm*—Heslin Rothenberg Farley & Mesiti P.C.

(57) ABSTRACT

A polymeric composition to be used in producing low density foam in which the polymeric composition comprises high density polyethylene, alkenyl aromatic polymer and a linear low density polyethylene. The polymeric resins may be prime virgin resin, offgrade virgin resin, recycled resin from a post industrial source, recycled resin from a post consumer source, or blends thereof Inventive compositions for producing polymeric foam are characterized by Dynamic Mechanical Spectroscopy to have a complex viscosity ($\eta^*$) in the range of $6.0 \times 10^4$ to $2.5 \times 10^5$ poise and a loss tangent (tan $\delta$) in the range of 0.7 to 2.1 at 190° C. and a power-law relation between tan $\delta$ and $\eta^*$ where the exponent is within the range between −0.70 and −0.30 for the temperature range of 190° to 230° C.

21 Claims, No Drawings

LOW DENSITY POLYMERIC FOAM USING A THREE-POLYMER BLEND

BACKGROUND OF THE INVENTION

The present invention is directed to a polymeric composition to be used in producing foam. Specifically, the polymeric composition is comprised of a high density polyethylene, an alkenyl aromatic polymer and a linear low density polyethylene.

Low density polymeric foams, which have a density in the range of 10 kg/m$^3$ to 160 kg/m$^3$, have been made for many years. These polymeric foams have generally been made by combining a physical blowing agent with a molten polymeric mixture under pressure and, after thorough mixing, extruding the combination through an appropriate die into a lower pressure atmosphere.

Polymeric foams designed for protective packaging of books, furniture, office equipment, weapons, and other items of value require light weight, resilient materials in order to protect the packaged items from handling without adding significant weight and bulk, and thus cost, to the overall package for transport. Polymeric foams designed for applications such as recreational items like bodyboards and floatation devices also require resilient materials so as not to permanently deform under multiple applications of compressive and shear forces during use. Polymeric foams designed for floor underlayment also require resilient materials so as not to permanently deform under multiple applications of compressive forces during use. Although there have been recent reports of compositions comprising other polymers for foams made for such applications, resilient, low-density polymeric foams are most commonly made from low density polyethylene (LDPE).

Polymeric foams composed of LDPE are generally considered to be resilient and non-brittle, which are desirable properties. However, despite widespread usage, these foams have disadvantages related directly to the LDPE component. Because LDPE will reduce important physical properties of blends that comprise the more widely-used polyethylenes, "high density polyethylene" and "linear low density polyethylene", there are limited recovery or reuse options for the LDPE packaging material after the packaged item is delivered to the end-user. Consequently, the major fraction of LDPE-only materials used for packaging is destroyed by incineration or is deposited in landfills. Another disadvantage is that LDPE is not a commodity and therefore poses higher material costs than related commodity plastics like high density polyethylene (HDPE) and linear low density polyethylene (LLDPE). HDPE has extensive usage in many applications such as bottles for freshly packaged liquids for human consumption like milk, orange juice, and ciders, bottles for household and industrial chemicals, flexible tubing, and toys. LLDPE has widespread usage for packaging films, plastic wraps, and plastic bags. Furthermore, the current process requirements for LDPE foams severely restrict the incorporation of recycled polyethylene from post-consumer and post-industrial sources. Incorporation of recycled polyethylene into a polyethylene foam structure would be very desirable as new regulations are introduced to reduce waste and to recover and reuse industrial materials.

Accordingly, a need exists for foams that overcome the above-noted shortcomings associated with LDPE-only foams.

BRIEF SUMMARY OF THE INVENTION

It is an object of the present invention to produce a foam that can be recycled and which can use recycled polyethylene as a feedstock.

It is a further object of the present invention to produce a foam that can be processed with conventional foaming machinery.

It is yet a further object of the present invention to produce a foam that is light in weight.

It is yet another object of the present invention to produce a foam that is dimensionally stable.

Lastly, it is an object of the invention to produce a resilient, non-brittle, low cost foam structure that can be used for sports and leisure equipment such as bodyboards, life vests, seat cushions, and floatation devices or that can be used for floor underlayment and which would also be suitable for protective packaging of delicate and fragile high surface quality goods.

The polymeric composition to be used in producing foam of the present invention comprises from about 5 to about 85 weight percent of a HDPE, from about 5 to about 85 weight percent alkenyl aromatic polymer, and from about 5 to about 85 of a LLDPE. Inventive blends for producing foam comprising the three polymeric types are characterized by a complex viscosity ($\eta^*$) in the range of $6.0 \times 10^4$ to $2.5 \times 10^5$ poise and a loss tangent (tan $\delta$) in the range of 0.7 to 2.1 at 190° C., and a power-law relation between tan $\delta$ and $\eta^*$ where the exponent is within the range between −0.70 and −0.35 for the temperature range of 190° to 230° C.

According to one process for preparing a polymeric foam of the present invention, a HDPE, an alkenyl aromatic polymer and a LLDPE are melted to form a polymeric composition. The polymeric composition comprises from about 5 to 85 weight percent of HDPE, from about 5 to about 85 weight percent of alkenyl aromatic polymer and from about 5 to about 85 weight percent of the LLDPE. The blend of the three-polymer mixture is characterized by a complex viscosity ($\eta^*$) in the range of $6.0 \times 10^4$ to $2.5 \times 10^5$ poise and a loss tangent (tan $\delta$) in the range of 0.70 to 2.1 at 190° C. and a power-law relation between tan $\delta$ and $\eta^*$ where the exponent is within the range between −0.70 and −0.35 for the temperature range of 190° to 230° C. A stability control agent may be added to the polymeric composition. An effective amount of blowing agent is dissolved to form a mixture. The mixture is transferred to an expansion zone and is permitted to expand in the expansion zone to produce the polymeric foam.

The polymeric foams may comprise readily available low cost materials such as recycled high density polyethylene, recycled low density polyethylene, and recycled polystyrene. Polymeric foams made from the inventive composition are dimensionally stable. The polymeric foams made from the inventive composition are recyclable. Certain physical properties of the polymeric foams, such as resiliency or flexural strength, can be adjusted to meet specific targets by adjusting the ratio of the three polymer types. Foams produced by the three-polymer blend can be produced with sufficient strength/weight ratio for uses such as bodyboards, life vests, seat cushions, and floatation devices. Foams produced by the three polymer blend can also be produced sufficient resiliency for use as floor underlayment and for protective packaging of delicate and fragile high surface quality goods.

DETAILED DESCRIPTION OF THE INVENTION

The polymeric composition to be used in producing foam of the present invention comprises HDPE from about 5 to 85 weight percent, alkenyl aromatic polymer from about 5 to about 85 weight percent, and a LLDPE from about 5 to about 85 weight percent. The rheological properties of the inventive polymeric blends are characterized as follows by Dynamic Mechanical Spectroscopy measured in accordance with standard test methods ASTM D4440 or ISO 6721-10 using a frequency of 1.00 radians/sec and 25 mm parallel plates with a 1.00 mm gap: complex viscosity ($\eta^*$) in the range of $6.0\times10^4$ to $2.5\times10^5$ poise and a loss tangent (tan $\delta$) in the range of 0.7 to 2.1 at 190° C., and a power-law relationship between tan $\delta$ and $\eta^*$ where the exponent is in the range of –0.70 and –0.30 for the temperature range of 190° C. to 230° C.

There are four preferred polymeric compositions. The first preferred polymeric composition is referred herein as "Balanced". The second preferred polymeric composition is referred herein as "Predominantly HDPE". The third preferred polymeric composition is referred herein as "Predominantly LLDPE". The fourth preferred polymeric composition is referred herein as "Predominantly Alkenyl Aromatic Polymer".

Preferred Balanced Polymer Composition

The preferred Balanced polymeric composition comprises HDPE from about 30 to about 40 weight percent, alkenyl aromatic polymer from about 30 to about 40 weight percent, and a LLDPE from about 30 to about 40 weight percent. The preferred Balanced polymeric blend is similarly characterized by complex viscosity ($\eta^*$) in the range of $9.0\times10^4$ to $1.6\times10^5$ poise and a loss tangent (tan $\delta$) in the range of 0.9 to 1.5 at 190° C., and a power-law relationship between tan $\delta$ and $\eta^*$ where the exponent is in the range of –0.65 and –0.54 for the temperature range of 190° C. to 230° C.

The most preferred Balanced polymeric composition comprises HDPE from about 31 to about 35 weight percent, alkenyl aromatic polymer from about 31 to about 35 weight percent, and LLDPE from about 31 to about 35 weight percent. The most preferred polymeric blend is similarly characterized by complex viscosity ($\eta^*$) in the range of $1.0\times10^5$ to $1.4\times10^5$ poise and a loss tangent (tan $\delta$) in the range of 1.0 to 1.35 at 190° C., and a power-law relationship between tan $\delta$ and $\eta^*$ where the exponent is in the range of –0.62 and –0.56 for the temperature range of 190° C. to 230° C.

Suitable LLDPE for comprising the Balanced polymeric composition to produce low density polymeric foam in the range of 10 to 160 kg/m³ is characterized by a loss tangent (tan $\delta$) in the range of 0.9 to 2.5 and complex viscosity ($\eta^*$) in the range of $1.0\times10^4$ to $1.0\times10^5$ poise at 190° C. If the LLDPE component of a Balanced polymeric composition is characterized by a loss tangent (tan $\delta$) greater than about 3.0 and this complex viscosity range at 190° C., dimensionally stable foam will generally not be produced.

Preferred Predominantly HDPE Polymeric Composition

The preferred Predominantly HDPE polymeric composition comprises HDPE from about 50 to about 80 weight percent, alkenyl aromatic polymer from about 10 to about 25 weight percent, and a LLDPE from about 10 to about 25 weight percent. The preferred Predominantly HDPE polymeric blend is similarly characterized by complex viscosity ($\eta^*$) in the range of $8.0\times10^4$ to $2.0\times10^5$ poise and a loss tangent (tan $\delta$) in the range of 0.9 to 1.8 at 190° C., and a power-law relationship between tan $\delta$ and $\eta^*$ where the exponent is in the range of –0.60 and –0.30 for the temperature range of 190° C. to 230° C.

The most preferred Predominantly HDPE polymeric composition comprises HDPE from about 60 to about 75 weight percent, alkenyl aromatic polymer from about 12.5 to about 20 weight percent, and LLDPE from about 12.5 to about 20 weight percent. The most preferred polymeric blend is similarly characterized by complex viscosity ($\eta^*$) in the range of $9.3\times10^4$ to $1.8\times10^5$ poise and a loss tangent (tan $\delta$) in the range of 1.1 to 1.75 at 190° C., and a power-law relationship between tan $\delta$ and $\eta^*$ where the exponent is in the range of –0.56 and –0.39 for the temperature range of 190° C. to 230° C.

Preferred Predominantly LLDPE Polymer Composition

The preferred Predominantly LLDPE polymeric composition comprises HDPE from about 10 to about 25 weight percent, alkenyl aromatic polymer from about 10 to about 25 weight percent, and a LLDPE from about 50 to about 80 weight percent. The preferred Predominantly LLDPE polymeric blend is similarly characterized by complex viscosity ($\eta^*$) in the range of $6.0\times10^4$ to $9.5\times10^4$ poise and a loss tangent (tan $\delta$) in the range of 1.0 to 1.5 at 190° C., and a power-law relationship between tan $\delta$ and $\eta^*$ where the exponent is in the range of –0.62 and –0.53 for the temperature range of 190° C. to 230° C.

The most preferred Predominantly LLDPE polymeric composition comprises HDPE from about 12.5 to about 20 weight percent, alkenyl aromatic polymer from about 12.5 to about 20 weight percent, and LLDPE from about 60 to about 75 weight percent. The most preferred polymeric blend is similarly characterized by complex viscosity ($\eta^*$) in the range of $6.5\times10^4$ to $8.8\times10^4$ poise and a loss tangent (tan $\delta$) in the range of 1.15 to 1.25 at 190° C., and a power-law relationship between tan $\delta$ and $\eta^*$ where the exponent is in the range of –0.60 and –0.56 for the temperature range of 190° C. to 230° C.

Suitable LLDPE for comprising the Predominantly LLDPE polymeric composition to produce low density polymeric foam in the range of 10 to 160 kg/m³ is characterized by a loss tangent (tan $\delta$) in the range of 0.9 to 1.8 and complex viscosity ($\eta^*$) in the range of $1.0\times10^4$ to $1.0\times10^5$ poise at 190° C. If the LLDPE component of a Predominantly LLDPE polymeric composition is characterized by a loss tangent (tan $\delta$) greater than about 2.0 and this complex viscosity range at 190° C., dimensionally stable foam will generally not be produced.

Preferred Predominantly Alkenyl Aromatic Polymer Composition

The preferred Predominantly Alkenyl Aromatic polymeric composition comprises HDPE from about 10 to about 25 weight percent, alkenyl aromatic polymer from about 50 to about 80 weight percent, and a LLDPE from about 10 to about 25 weight percent. The preferred Predominantly Alkenyl Aromatic polymeric blend is similarly characterized by a complex viscosity ($\eta^*$) in the range of $1.3\times10^5$ to $2.3\times10^5$ poise and a loss tangent (tan $\delta$) in the range of 1.0 to 1.75 at 190° C., and a power-law relationship between tan $\delta$ and $\eta^*$ where the exponent is in the range of –0.68 and –0.57 for the temperature range of 190° C. to 230° C.

The most preferred Predominantly Alkenyl Aromatic polymeric composition comprises HDPE from about 12.5 to about 20 weight percent, alkenyl aromatic polymer from about 60 to about 75 weight percent, and LLDPE from about 12.5 to about 20 weight percent. The most preferred polymeric blend is similarly characterized by a loss tangent (tan $\delta$) in the range of 1.1 to 1.7 and complex viscosity ($\eta^*$) in the range of $1.45\times10^5$ to $2.15\times10^5$ poise at 190° C., and a power-law relationship between tan $\delta$ and $\eta^*$ where the exponent is in the range of –0.65 and –0.60 for the temperature range of 190° C. to 230° C.

HDPEs

The high density polyethylene (HDPE) of the present invention has a specific gravity of from about 940 to about 970 kg/m³. The term "HDPE" is used herein to mean polyethylene resin that is typically used in applications such as bottles for freshly packed liquids for human consumption like milk, orange juice, juice drinks, and ciders, bottles for household and industrial chemicals, flexible tubing, and toys. HDPEs are generally crystalline materials, meaning that they typically have a small temperature range (3-10° C.) with a sharp transition between the solid and molten phases. The molecular structures of HDPEs have limited branching from the main polymer chains. Although certain HDPEs may have adequate melt strength for applications such as blow molding, virtually all materials classified as HDPE have insufficient melt strength to produce dimensionally stable foam in a conventional foam extrusion process.

The term "HDPE", as used herein, is meant to include not only homopolymers of ethene, but also high density polyethylene copolymers composed of both at least 50 mole percent (preferably at least 70 mole percent) of a ethene monomer and a minor proportion of a monomer copolymerizable with ethene, and physical blends of at least 50 percent by weight (preferably at least 60 percent by weight) of the HDPE homopolymer with another polymer.

The HDPE of the present invention may come from a resin manufacturer as virgin resin. The term "virgin resin" is used herein as being polymeric material directly from a material supplier that has not been extruded after initial processing by the material supplier. The term "prime" is used in the art to further describe material that is within the intended specification range for the polymeric virgin resin. Further, because HDPE resin manufacturers often produce a number of different grades of HDPE on the same manufacturing line for the many different applications, the transitions between grades provides numerous opportunities for product that does not meet a particular specification. Thus, there are numerous resources for offgrade virgin HDPE. Regularly used synonyms for "offgrade" in the art are "off-spec" and "wide-spec".

The term "offgrade virgin HDPE" is used herein to describe virgin HDPE polymeric material that has been identified by a material manufacturer as not meeting certain grade specifications for specific customer applications. Suitable offgrade virgin HDPEs for the present invention are characterized by rheological properties measured by Dynamic Mechanical Spectroscopy. Offgrade virgin HDPE material for this invention will have good physical properties typical of HDPE at normal ambient temperatures. Offgrade virgin HDPE is typically available at a price that is in the range of 20% to 50% of typical virgin HDPE prices.

The HDPE of the present invention may also come from a material re-processor as "recycled high density polyethylene". The term "recycled HDPE" is used herein to describe polymeric material identified by a material re-processor that has been extruded after initial processing by the original material manufacturer. Because more than 90% of the world production of HDPE is generally used in compositions that do not include other polymers, recycled "high density polyethylene" is predominately ethene homopolymer.

The recycled HDPE may come from post-industrial or post-consumer sources. The recycled HDPE source may include polymeric material that has been recovered from plastic parts which bear the numeral "1" inside of the conventional triangular-shaped three-bent-arrow recycle symbol now mandated by government agencies for plastic parts in general consumer service. Recycled HDPE that comprises a portion of the foam made by the present invention, and which is to be utilized for food-service applications must be substantially free of certain materials that would be unsuitable for human consumption such as certain waxes, machine oils, and most heavy metal inorganic and heavy metal organometallic compounds. Suitable recycled HDPEs for the present invention are characterized by the rheological properties measured by Dynamic Mechanical Spectroscopy. Recycled HDPE material for this invention will have good physical properties typical of HDPE at normal ambient temperatures. Recycled HDPE is typically available at a price that is in the range of 15% to 40% of typical virgin HDPE prices.

HDPE suitable for the inventive composition is characterized as follows by Dynamic Mechanical Spectroscopy measured in accordance with standard test methods ASTM D4440 or ISO 6721-10 using a frequency of 1.00 radians/sec and 25 mm diameter parallel plates with a 1.00 mm gap: complex viscosity ($\eta^*$) in the range of $7.0 \times 10^4$ to $2.2 \times 10^5$ poise and a loss tangent (tan $\delta$) in the range of 0.9 to 3.0 and 190° C., and a power-law relationship between tan $\delta$ and $\eta^*$ where the exponent is in the range of $-0.45$ and $-0.25$ for the temperature range of 190° C. to 230° C. The preferred HDPE is similarly characterized by $\eta^*$ in the range of $8.5 \times 10^4$ to $2.0 \times 10^5$ poise and tan $\delta$ in the range of 1.1 to 1.65 at 190° C., and a power-law relationship between tan $\delta$ and $\eta^*$ where the exponent is in the range of $-0.35$ and $-0.25$ for the temperature range of 190° C. to 230° C.

The HDPE of the present invention may be prime virgin HDPE, offgrade virgin HDPE, reclaimed post-industrial HDPE, reclaimed post-consumer HDPE, or blends thereof in which the complex viscosity of the combination and the damping factor of the combination are simultaneously within the aforementioned ranges.

Alkenyl Aromatic Polymer

The term "alkenyl aromatic polymer" is used herein to mean polymers of aromatic hydrocarbon molecules that contain an aryl group joined to an olefinic group with only one double bond in the linear structure. Examples of "alkenyl aromatic polymers" include polymers of styrene, α-methylstyrene, o-methylstyrene, m-methylstyrene, p-methylstyrene, α-ethylstyrene, α-vinylxylene, α-chlorostyrene, α-bromostyrene, vinyl toluene and the like. Alkenyl aromatic polymers in everyday usage include homopolymers of styrene, homopolymers of α-methylstyrene, copolymers of styrene and butadiene, and copolymers of styrene and maleic anhydride.

Alkenyl aromatic polymers are typically amorphous materials. Amorphous materials do not have a sharp transition between the solid and liquid phases within a small temperature range. To the contrary, such materials exhibit a change in which the solid phase becomes a very viscous "liquid" over a temperature range as broad as about 50° C. The temperature at which there is an inflection point in the change of melting behavior serves as one characterization of the polymer and has been called the "glass transition temperature". Amorphous materials generally have high melt strength.

The alkenyl aromatic polymer of the present invention may come from a resin manufacturer as virgin resin. The term "virgin resin" is used herein as being polymeric material directly from a material supplier that has not been extruded after initial processing by the material supplier. The term "prime" is used in the art to further describe material that is within the intended specification range for the polymeric virgin resin. Further, because alkenyl aromatic polymer resin manufacturers often produce a number of different grades of alkenyl aromatic polymer on the same manufacturing line for the many different applications, the transitions between grades provides numerous opportunities for product that does not meet a particular specification. Thus, there are numerous resources for offgrade virgin alkenyl aromatic polymer. Regularly used synonyms for "offgrade" in the art are to "off-spec" and "wide-spec".

The term "offgrade alkenyl aromatic polymer" is used herein to describe virgin alkenyl aromatic polymer polymeric material that has been identified by a material manufacturer as not meeting certain grade specifications for specific customer applications. Suitable offgrade virgin alkenyl aromatic polymers for the present invention are characterized by rheological properties measured by Dynamic Mechanical Spectroscopy. Offgrade virgin alkenyl aromatic polymer material for this invention will have good physical properties typical of alkenyl aromatic polymer at normal ambient temperatures. Offgrade virgin alkenyl aromatic polymer is typically available at a price that is in the range of 20% to 50% of typical virgin alkenyl aromatic polymer prices.

The alkenyl aromatic polymer of the present invention may also come from a material re-processor as "recycled polystyrene". The term "recycled alkenyl aromatic polymer" is used herein to describe polymeric material identified by a material re-processor that has been extruded after initial processing by the original material manufacturer. Because more than 75% of the world production of alkenyl aromatic polymers is polystyrene or copolymers of styrene and butadiene, recycled "polystyrene" is predominately a mixture of crystal and impact polystyrene in varying proportions.

The recycled alkenyl aromatic polymer may come from post-industrial or post-consumer sources. The recycled alkenyl aromatic polymer source may include polymeric material that has been recovered from plastic parts which bear the numeral "6" inside of the conventional triangular-shaped three-bent-arrow recycle symbol now mandated by government agencies for plastic parts in general consumer service. Recycled alkenyl aromatic polymer that comprises a portion of the foam made by the present invention, and which is to be utilized for food-service applications must be substantially free of certain materials that would be unsuitable for human consumption such as certain waxes, machine oils, and most heavy metal inorganic and heavy metal organometallic compounds. Suitable recycled alkenyl aromatic polymers for the present invention are characterized by the rheological properties measured by Dynamic Mechanical Spectroscopy. Recycled alkenyl aromatic polymer material for this invention will have good physical properties typical of alkenyl aromatic polymer at normal ambient temperatures. Recycled alkenyl aromatic polymer is typically available at a price that is in the range of 15% to 40% of typical virgin alkenyl aromatic polymer prices.

Preferred alkenyl aromatic polymers for the present invention includes the homopolymers of styrene, styrene-butadiene copolymers, and styrene/maleic anhydride copolymers.

Homopolymers of styrene are commonly referred to as "crystal polystyrene". The term "crystal" is generally accepted in the art to describe polymers that have the appearance of a clear, glassy material when in its pure solid form. The term "crystal" should not be confused with the term "crystalline" that is used to describe the solid-liquid phase change behavior of some polymers. Crystal polystyrenes are amorphous.

Because there are many different uses for crystal polystyrene, there are many potential sources for recycled crystal polystyrene. Crystal polystyrenes are used in numerous single-use food service applications such as foam plates, clear cold beverage cups, foam hot beverage cups, foam bowls, clear carryout containers for baked goods, and foam restaurant carryout containers. Crystal polystyrenes comprise polymeric foams for numerous residential and industrial insulation applications. Crystal polystyrenes comprise polymeric foams for numerous packaging applications like packing "peanuts", support fillers for boxes containing heavy items like air conditioners, televisions, and insulating boxes for expedited delivery of refrigerated fresh foods or frozen foods. Crystal polystyrenes also comprise polymeric foams for low cost recreational items, like coolers for transport of foods and beverages.

Copolymers of styrene and butadiene are commonly available from more than one polymerization process. Copolymers of styrene and butadiene made by one process can have significantly different physical properties from copolymers of the other process, even if the empirical chemical composition is equivalent. The first family of styrene-butadiene copolymers is made in a graft polymerization process in which the polymerization reaction of one monomer is based upon a nucleus of a polymer of the other monomer or a smaller chain polymer of the two-monomer blend. A second family of styrene-butadiene copolymers is made in a polymerization process in which the monomers are mixed in the liquid form.

The first family of copolymers of styrene and butadiene is the most prevalent and is commonly referred to as "impact polystyrene." These graft copolymers of polystyrene and butadiene are obtained by polymerizing a blend of polymerized styrene upon a nucleus of styrene-butadiene rubber (SBR) to a weight-average molecular weight of from about 100,000 to about 350,000. Impact polystyrenes are generally classified as medium impact polystyrene (MIPS), high impact polystyrene (HIPS) or super high impact polystyrene (S-HIPS). Classification of impact polystyrene is generally based upon a Notched Izod Impact test, which measures the energy required to break notched specimens under standard conditions and is reported in units of work per unit of notch. A higher Notched Izod Impact value, therefore, indicates a tougher material. This classification also generally relates directly to the concentration of butadiene in the polymeric composition. The butadiene level of virgin impact polystyrene available commercially is generally in the range from about 3 to about 10 weight percent of the copolymer (butadiene and polystyrene). Impact polystyrene can also be blended with crystal polystyrene to adjust desired physical properties.

There are many potential sources for recycled impact polystyrene. Impact polystyrenes are used in numerous single-use food service applications such as inserts for hot beverage containers, translucent and opaque cups for cold beverages, removable lids for cold beverage cups, lids for cups for hot beverages, and eating utensils. Impact polystyrenes are also combined with crystal polystyrenes to enhance certain properties of polymeric foams for food service applications.

The second family of copolymers of styrene and butadiene that is in routine usage does not have a specific family name in the art, but may be simply be referred to by the styrene-butadiene copolymer acronym, SBC. The copolymers of this family are clear, tough materials. SBC materials are used in a variety of products, such as food packaging, candy wraps, toys, clear cups for cold beverages, garment hangers, and certain medical device components. Since processes for manufacturing clear SBC materials are more costly than processes for manufacturing impact polymers, clear SBC materials are sometimes blended with crystal polystyrene in order to reduce the costs of the products.

Copolymers of styrene and maleic anhydride are commonly referred to in the art by its acronym of SMA. Copolymers of styrene and maleic anhydride have a higher service temperature than crystal polystyrene or the copolymers of styrene and butadiene. SMA resins are in widespread usage for manufacture of interior components of automobiles and other vehicles.

Alkenyl aromatic polymer suitable for the inventive composition is characterized as follows by Dynamic Mechanical Spectroscopy measured in accordance with standard test methods ASTM D4440 or ISO 6721-10 using a frequency of 1.00 radians/sec and 25 mm diameter parallel plates with a 1.00 mm gap: complex viscosity ($\eta^*$) in the range of $1.8\times10^5$ to $3.6\times10^5$ poise and a loss tangent is (tan $\delta$) in the range of 0.8 to 1.5 and 190° C., and a power-law relationship between tan $\delta$ and $\eta^*$ where the exponent is in the range of $-0.65$ and $-0.50$ for the temperature range of 190° C. to 230° C. The preferred alkenyl aromatic polymer is similarly characterized by $\eta^*$ in the range of $2.2\times10^5$ to $3.5\times10^5$ poise and tan $\delta$ in the range of 0.9 to 1.35 at 190° C., and a power-law relationship between tan $\delta$ and $\eta^*$ where the exponent is in the range of $-0.62$ and $-0.52$ for the temperature range of 190° C. to 230° C.

The alkenyl aromatic polymer of the present invention may be prime virgin alkenyl aromatic polymer, offgrade virgin alkenyl aromatic polymer, reclaimed post-industrial alkenyl aromatic polymer, reclaimed post-consumer alkenyl aromatic polymer, or blends thereof in which the complex viscosity of the combination and the damping factor of the combination are simultaneously within the aforementioned ranges.

LLDPEs

Linear low density polyethylenes (LLDPEs) of the present invention are uncrosslinked copolymers of ethene and one or more $C_4$-$C_{12}$ α-olefins having a specific gravity from about 910 to about 940 kg/m³. The term "LLDPE" is used herein to mean polyethylene resin that is typically used in applications such as for packaging film wraps, plastic bubble wrap, and plastic bags. LLDPEs are generally crystalline materials, meaning that they typically have a small temperature range (3-10° C.) with a sharp transition between the solid and molten phases. The molecular structures of LLDPEs have repetitive branches of ten carbon atoms or less from the main polymer chains and very limited branches containing more than ten atoms from the main polymer chains.

A novelty of the present invention is a polymeric foam composition comprising conventional linear low density polyethylene at more than trace concentrations. Conventional linear low density polyethylenes typically have very low melt strength and have heretofore been demonstrated to be non-foamable in the art. In combinations with a low density polyethylene (LDPE) that is routinely used to produce foam, compositions comprising conventional linear low density polyethylene at concentrations as low as 1% have been shown to interfere with production of dimensionally stable foam. DeVaudreuil et al, U.S. Pat. No. 6,114,025, reported that specific linear low density polyethylenes having a certain z-average molecular weight can comprise a polymeric foam when used in combination with a "resiliency modifier resin". The reported "resiliency modifier resins" included LDPE, MDPE, and specific low density ethylene copolymers and did not include HDPE, polystyrene, and styrene copolymers.

The preferred LLDPE has a specific gravity of from about 915 to about 925 kg/m. Preferred LLDPEs for the present invention include copolymers of ethene with 1-butene, 1-hexene, 1-octene and combinations thereof. Preferred LLDPEs may be made by a conventional process with a Ziegler-Natta catalyst or in a gas phase process. Most preferred LLDPE are copolymers of ethene with 1-hexene, 1-octene and combinations thereof Most preferred LLDPEs are made in a gas phase process.

The LLDPE of the present invention may come from a resin manufacturer as virgin resin. The term "virgin LLDPE" is used herein as being polymeric material directly from a material supplier that has not been extruded after initial processing by the material supplier. The term "prime" is used in the art to further describe material that is within the intended specification range for the polymeric virgin resin. Because LLDPE resin manufacturers often produce a number of different grades of LLDPE on the same manufacturing line for the many different applications, the transitions between grades provides numerous opportunities for product that does not meet a particular specification. Thus, there are numerous resources for offgrade virgin LLDPE. Regularly used synonyms for "offgrade" in the art are "off-spec" and "wide-spec".

The term "offgrade virgin LLDPE" is used herein to describe virgin LLDPE polymeric material that has been identified by a material manufacturer as not meeting certain grade specifications for specific customer applications. Suitable offgrade virgin LLDPEs for the present invention are characterized by rheological properties measured by Dynamic Mechanical Spectroscopy. Offgrade virgin LLDPE material for this invention will have good physical properties typical of LLDPE at normal ambient temperatures. Offgrade virgin LLDPE is typically available at a price that is in the range of 20% to 50% of typical virgin LLDPE prices.

The LLDPE of the present invention may also come from a material re-processor as "recycled low density polyethylene". The term "recycled low density polyethylene" is used herein to describe polymeric material identified by a material re-processor that has been extruded after initial processing by the original material manufacturer or from a material re-processor as "recycled low density polyethylene". Because more than 60% of the world production polymer classified as "low density polyethylene" actually has a structure of LLDPE, recycled low density polyethylene is predominately LLDPE. The recycled low density polyethylene may come from post-industrial or post-consumer sources. Prior art has taught that linear low density polyethylene is not foamable. Therefore, because of the high concentration of linear low density polyethylene in "recycled low density polyethylene", "recycled low density polyethylene" has not used as a feed material for production of polyethylene foam. The recycled low density polyethylene source may include polymeric material that has been recovered from plastic items which bear the numeral "4" inside of the conventional triangular-shaped three-bent-arrow recycle symbol now mandated by government agencies for plastic items in general consumer service. Some items are also additionally identified with the term "PE-LD". Recycled low density polyethylene that comprises a portion of the foam made by the present invention, and which is to be utilized for food-service applications must be substantially free of certain materials that would be unsuitable for human consumption such as certain waxes, machine oils, and most heavy metal inorganic and heavy metal organometallic compounds.

The LLDPE of the present invention is characterized as follows by Dynamic Mechanical Spectroscopy measured in accordance with standard test methods ASTM D4440 or ISO 6721-10 using a frequency of 1.00 radians/sec and 25 mm diameter parallel plates with a 1.00 mm gap: complex viscosity ($\eta^*$) in the range of $1.0 \times 10^4$ to $1.0 \times 10^5$ poise and a loss tangent (tan $\delta$) in the range of 0.9 to 6.0 at 190° C. The preferred LLDPE is similarly characterized by $\eta^*$ in the range of $3.0 \times 10^4$ to $8.0 \times 10^4$ poise and tan $\delta$ in the range of 1.0 to 2.5 at 190° C. The most preferred LLDPE is similarly characterized by $\eta^*$ in the range of $4.2 \times 10^4$ to $7.7 \times 10^4$ poise and tan $\delta$ in the range of 1.0 to 1.8 at 190° C.

The LLDPE of the present invention may be prime virgin LLDPE, offgrade virgin LLDPE, reclaimed post-industrial low density polyethylene, reclaimed post-consumer low density polyethylene, or blends thereof in which the complex viscosity of the combination and the damping factor of the combination are simultaneously within the aforementioned ranges.

For the three-polymer blends of HDPE, alkenyl aromatic polymer and LLDPE, the rheological properties of LLDPE have the most significant at imposing limits on compositions that can produce a dimensionally stable foam with density in the range of 10 kg/m³ to 160 kg/m³ using a conventional foam process.

Dynamic Mechanical Spectroscopy

Rheology is the branch of physics that studies the flow of matter. Simple chemical compounds like air and water, which are either gas or liquid at normal ambient temperatures, exhibit flow and are classified as fluids. An important distinguishing property of fluids is known as viscosity, which is a measurement of the resistance to flow. Fluids are thus considered to have "viscous" properties. Other simple chemical compounds like steel at normal ambient temperatures are classified as elastic. The term "elastic" refers to the capability to return to original shape after application of stretching or compressive forces. Important distinguishing measurements of elastic materials are generally reported with the word "modulus", such as storage and or loss modulus. Depending upon the measurement technique, the storage modulus is referred to as E' or G', while the loss modulus is referred to as E" or G". Unlike the simpler chemical compounds, polymeric materials have a complex rheological behavior. Polymeric materials are considered to have "viscoelastic" characteristics, which means that they simultaneously exhibit both viscous and elastic properties. The viscous and elastic properties of polymeric materials change behavior over a broad range of temperatures. The particular viscoelastic behavior of a polymeric material depends upon its molecular structure and thus a certain range of rheological values can be used to characterize the behavior of a particular polymeric material.

Standardized terminology and test methods have been developed by organizations respected worldwide, such as ASTM International, or the International Standards Organization (ISO) to quantify the dynamic behavior of various materials. ASTM D4092-01, "Standard Terminology: Plastics: Dynamic Mechanical Properties", by ASTM International provides the broadest compilation of the generally accepted definitions and the descriptions of technical terms associated with measurement of dynamic mechanical properties of polymeric materials. The ASTM International definitions for the terms utilized in describing the materials of this invention is incorporated herein by reference.

ASTM D4440-01, "Standard Test Method for Plastics: Dynamic Mechanical Properties: Melt Rheology", by ASTM International, and ISO 6721 Part 10, "Plastics-Determination of Dynamical Properties, Part 10, Complex Shear Viscosity Using a Parallel Plate Oscillatory Rheometer" by the International Standards Organization detail generally acceptable methods for utilization of dynamic mechanical instrumentation in reporting rheological properties of thermoplastic polymeric materials at various conditions of frequency, strain amplitude, and temperature. These test methods, incorporated herein by refernce, have been utilized to characterize the materials of this invention.

Dynamical Mechanical Spectroscopy is the term generally used to describe dynamic mechanical testing of materials over a range of temperatures and/or frequency using parallel plate geometry. The standardized tests specify testing with two parallel plates with equal diameters but allows variable plate diameters and gaps between those plates in the reported testing configuration. Two important rheological values provided by the standardized dynamic mechanical testing of molten polymers are the loss tangent, identified by the expression tan $\delta$, and the complex viscosity, identified with the symbol $\eta^*$. The viscoelastic characteristic of loss tangent is alternatively called the damping factor. As reported herein, Dynamic Mechanical Spectroscopy property values refers to testing results as measured in accordance with standard test methods ASTM D4440 or ISO 6721-10 in the temperature range of 140° C. to 230° C. and a frequency of 1.00 radians/sec using a 25 mm diameter parallel plates with a gap of 1.00 mm.

Although the loss tangent (tan $\delta$) and the complex viscosity ($\eta^*$) are normally adequate to describe the rheological behavior of polymers for many applications, the ability of a polymeric material to produce a polymeric foam in a conventional foam extrusion process is not sufficiently described by those rheological terms at only one particular temperature. For example, two materials which have equivalent tan $\delta$ and $\eta^*$ at a particular temperature can have antithetical results in a foaming process. Consequently, characterization of a polymeric material that can produce polymeric foam requires at least one additional value.

Testing of various homopolymers of ethene and polymeric blends that are predominately polyethylene have revealed that one such suitable characterizing value for these materials, which relates the damping factor to the complex viscosity, is the exponent in the approximating power-law relation between the damping factor (tan $\delta$) and the complex viscosity ($\eta^*$). There is no theoretical basis for this relationship. The power-law relation that describes the loss tangent (tan $\delta$) and the complex viscosity ($\eta^*$) is determined from a log-log regression analysis of the data from the two parameters. Alternatively stated, this means the plot of log(tan $\delta$) vs log($\eta^*$) can be approximated by a straight line, the slope ($b_1$) of which is the exponent in the power-law relation. This approximate relationship can be summarized as:

$$\log(\tan(\delta)) \approx b_1 \log(\eta^*) + b_0$$

In this approximating relationship, the significance of intercept ($b_0$) is not yet understood.

Nucleating Agent

A nucleating agent, or cell size control agent, may be any conventional or useful nucleating agent(s). The amount of nucleating agent to be added depends upon the desired cell size, the selected blowing agent, and the density of the polymeric composition. The nucleating agent is generally added in amounts from about 0.02 to about 2.0 weight percent of the polymeric composition. Some contemplated nucleating agents include inorganic materials (in small particulate form), such as clay, talc, silica, and diatomaceous earth. Other contemplated nucleating agents include organic nucleating agents that decompose or react at the heating temperature within the extruder to evolve gas, such as carbon dioxide and/or nitrogen.

One example of an organic nucleating agent is a combination of an alkali metal salt of a polycarboxylic acid with a carbonate or bicarbonate. Some examples of an alkali metal salt of a polycarboxylic acid include, but are not limited to, the monosodium salt of 2,3-dihydroxy-butanedioic acid (commonly referred to as sodium hydrogen tartrate), the monopotassium salt of butanedioic acid (commonly referred to as potassium hydrogen succinate), the trisodium and tripotassium salts of 2-hydroxy-1,2,3-propanetricarboxylic acid (commonly referred to as sodium and potassium citrate respectively), and the disodium salt of ethanedioic acid (commonly referred to as sodium oxalate) or polycarboxylic acid such as 2-hydroxy-1,2,3-propanetricarboxylic acid. Some examples of a carbonate or a bicarbonate include, but are not limited to, sodium carbonate, sodium bicarbonate, potassium bicarbonate, potassium carbonate and calcium carbonate.

One contemplated combination is a monoalkali metal salt of a polycarboxylic acid, such as monosodium citrate or monosodium tartrate, with a carbonate or bicarbonate. It is contemplated that mixtures of different nucleating agents may be added in the present invention. Preferred nucleating agents include talc, crystalline silica, and a stoichiometric mixture of citric acid and sodium bicarbonate (the stoichiometric mixture having a 1 to 100 percent concentration where the carrier is a suitable polymer such as low molecular weight polyethylene wax). Talc is preferably added in a carrier, but may also be added in a powder form The most preferred nucleating agent is crystalline silica at about 18 to about 22 weight percent loading in a LDPE carrier which is added to produce a silica concentration in the foam from about 0.05 to about 0.1 weight percent.

Stability Control Agent

The polymeric foam of the present invention is made with a stability control agent(s). Some examples of stability control agents include, but are not limited to, a partial ester of a long chain fatty acid and a polyol, such as glycerol monostearate; certain borate or phosphinate glycol ester compounds such as tri(1-stearyl-glycero)borate, tri(monostearylpolyoxyethyleneglycol) borate, di(1-stearylglycero) phosphinate; saturated higher fatty acid amides; saturated higher aliphatic amines and complete esters of saturated higher fatty acids, such as stearamide; N-higher aliphatic hydrocarbyl substituted amide of a $C_1$ to $C_8$ aliphatic carboxylic acid such as N-stearyl acetamide or N-stearyl caprylamide; certain higher aliphatic hydrocarbyl ether, ester or anhydride compounds such as behenic anhydride, distearyl ether, distearyl thioether, stearyl laurate and stearyl thiolaurate; certain naphthyl amine compounds such as N,N'-di-beta-naphthyl-paraphenylenediamine or N,N'-di-beta-naphthyl-paradiphenylenediamine, and glycerol monoester of a $C_{20}$-$C_{24}$ fatty acid. It is contemplated that mixtures of stability control agents may be used in the present invention.

Blowing Agents

It is contemplated that various blowing agents may be used in the present invention, including physical blowing agents such as hydrocarbons. The preferred physical blowing agents for this invention are organic chemical compounds that have boiling points less than about 37° C. These organic compounds include, but are not limited to, fully hydrogenated hydrocarbons and partially fluorinated hydrocarbons that are considered to be flammable. Flammable as defined herein generally includes those materials having flashpoints less than about 37.8° C.

The preferred fully hydrogenated hydrocarbon blowing agents include the initial members of the alkane series of hydrocarbons that contain up to five carbon atoms and which are not regulated by governmental agencies as being specifically toxic to human or plant life under normal exposure. These fully hydrogenated blowing agents include methane, ethane, propane, n-butane, isobutane, n-pentane, isopentane and blends thereof.

The most preferred fully hydrogenated hydrocarbon blowing agents are $C_2$ to $C_4$ compounds and blends thereof An example of a preferred blend is a blend of approximately 67 weight percent n-butane and approximately 33 weight percent isobutane, which is commonly referred to in the industry as an A21 butane blend. This blend may be added at a rate of from about 1 to about 20 weight percent of the total extruder flow rate, and preferably added at a rate of from about 3 to about 20 weight percent of the total extruder flow rate.

It is contemplated that auxiliary blowing agents may be used in the present invention in amounts less than about 40 weight percent of the total blowing agent. The preferred auxiliary blowing agent are partially fluorinated hydrocarbon blowing agents that have molecules containing up to three carbon atoms without any other halogen atoms, and those considered flammable. For example, this includes 1,1-difluoroethane (HFC-152a), and 1,1,1-trifluoroethane (HFC-143a), with the most preferred auxiliary blowing agent being HFC-152a. It is also contemplated that 1-1-chlorofluoroethane (HFC-142b) and 1-1-dichloro-2-fluoroethane (HFC-141b) may be added as auxiliary blowing agents for non-regulated insulation applications.

In addition, water may optionally be added at a low concentration level as an auxiliary blowing agent. The water quality should be at least adequate for human consumption. Water containing a high level of dissolved ions may cause excessive nucleation, so therefore deionized water is preferred. The preferred rate for water addition is from about 0.05 to about 0.5 parts water to 100 parts of the polymeric composition (0.05 to 0.5 phr). The most preferred rate of adding water is from about 0.2 to about 0.3 phr.

Additives

The term "additives" is customarily used in the art and is used herein to describe chemical species that may optionally be added to the foamable composition in order to alter specific physical or chemical properties of the foamed product. Additives do not adversely influence the foaming process but do change specific physical properties of the foamed product, such as color, or chemical properties of the foamed product, such as fire retardancy. It is contemplated that other additives may be added to the foamable composition, including, but not limited to, antistatics, coloring agents, fire retardants, anti-microbial agents, anti-mold agents, antioxidants and plasticizers.

A Process of the Present Invention

According to one process of the present invention, pellets of HDPE(s), alkenyl aromatic polymer(s), and LLDPE(s) are loaded in their solid form into an extrusion hopper. The polymeric composition comprises HDPE(s) from about 5 to 85 weight percent, alkenyl aromatic polymer(s) from about 5 to about 85 weight percent and LLDPE(s) from about 5 to about 85 weight percent. The polymeric composition, along with about 0.1 to about 2.0 weight percent loading of pellets of 20% silica compounded in polyethylene (the nucleating agent), are fed by gravity into a extruder.

A stability control agent, such as glycerol monostearate, is added to the polymeric composition in an amount from about 0.25 to about 1.3 weight percent of the polymeric composition. The stability control agent is generally added in amounts less than traditional LDPE only foams. The polymeric composition preferably comprises from about 0.35 to 0.80 weight percent of glycerol monostearate. The polymeric-silica mixture is conveyed through a feed zone of the extruder and heated at a temperature sufficient to form a polymeric-silica melt.

A physical blowing agent is added at the injection port area of the extruder in an appropriate ratio to the target density. The polymeric-silica melt and the selected blowing agent are thoroughly mixed within the extruder in a mixing zone, and subsequently cooled in a cooling zone. The cooled polymeric-blowing agent melt is extruded through a die (a die appropriate to the desired product form) into a lower pressure region, then formed into the desired shape and thereafter cooled by convection with ambient air. The extruded tube may be slit by, for example, a conventional slitting machine to form a foam sheet. The foam sheet may optionally pass through a heating oven in which heated forced air is blown directly over its surfaces to reduce the residual blowing agent. This process is referred herein as a "conventional foam extrusion process".

The Foamed Product

The polymeric foams produced with the invention composition generally have a density of from about 10 kg/m$^3$ to about 160 kg/m$^3$. These polymeric foams have properties that are similar to those found in LDPE foams in the art. The polymeric foams of the present invention are produced with consistently uniform physical properties. The polymeric foams are light in weight and may be used as protective or cushioning packaging for delicate goods such as computers, glassware, televisions, furniture, and any article that needs to be protected from gouging, surface-scratching or marring. Other contemplated applications for the polymeric foams of the present invention include uses in insulation, toys, floatation foam (e.g., life jackets) and recreational parts.

When producing polymeric foams having a density less than about 160 kg/m$^3$, a physical blowing agent, such as a hydrocarbon, is typically added at a rate of from about 2 to about 20 parts by weight to 100 parts of polymeric composition.

The polymeric foams of the present invention preferably have a thin cross-section. The term "thin cross-section" as used herein is defined as a dimension in the thickness direction of the foamed structure that is less than about 13 mm. The preferred dimension in the thickness direction of the present invention is from about 0.5 to about 13 mm. It is contemplated, however, that the polymeric foams of the present invention may have thicker cross-sections.

The foams of the present invention are "dimensionally" stable. Dimensional stability as defined herein is when the volume of the foam does not either deviate more than about 15 volume percent (i.e., does not either shrink more than about 15 volume percent or expand more than about 15 volume percent) from the volume of the polymeric foam at the time of production. The volume of the polymeric foam at the time of production is measured within about 15 minutes, and preferably within 10 minutes, after the foam exits the die. This measurement is used in determining the "fresh" density of the foam. To have a dimensionally stable product, the foam is typically measured after aging process for LDPEs (from about 14 to about 30 days) and compared to its fresh volume. It is recognized, however, that in the unlikely event that the foam at a later duration is not within about 15 volume percent of its fresh volume, then it is not a dimensionally stable product. It is preferable that the foam does not deviate more than about 10 volume percent from its "fresh" volume.

EXAMPLES

Inventive Example 1

Pellets of Atofina HL428 (HDPE) characterized by η* of 1.67×10$^5$ poise and tan δ of 1.19 at 190° C., Dow 685D Polystyrene (PS), and Union Carbide DFDA-2207 (LLDPE) characterized by a η* of 4.79×10$^4$ poise and tan δ of 1.16 at 190° C. blended together in the ratio of 33:33:33. The three-component polymeric blend is characterized by η* of 1.30×10$^5$ poise and tan δ, of 1.17 at 190° C. and a tan δ vs. η* power-law exponent of −0.607 for the range of 190° C. to 230° C. The blend will form a foamable composition that is capable of producing a foam with a density as low as 17 kg/m$^3$ in a conventional foam extrusion process.

Inventive Example 2

The HDPE/PS/LLDPE resin blend ratio of Example 1 was changed from 33:33:33 to 60:20:20. The three-component polymeric blend is characterized by η* of 1.44×10$^5$ poise and tan δ, of 1.18 at 190° C. and a tan δ vs. η* power-law exponent of −0.557 for the range of 190° C. to 230° C. The blend will form a foamable composition that is capable of producing a foam with a density as low as 17 kg/m$^3$ in a conventional foam extrusion process.

Inventive Example 3

The HDPE/PS/LLDPE resin blend ratio of Example 1 was changed from 33:33:33 to 20:20:60. The three-component polymeric blend is characterized by η* of 8.71×10$^4$ poise and tan δ, of 1.16 at 190° C. and a tan δ vs. η* power-law exponent of −0.590 for the range of 190° C. to 230° C. The blend will form a foamable composition that is capable of producing a foam with a density as low as 17 kg/m$^3$ in a conventional foam extrusion process.

Inventive Example 4

The HDPE/PS/LLDPE resin blend ratio of Example 1 was changed from 33:33:33 to 20:60:20. The three-component polymeric blend is characterized by η* of 1.74×10$^5$ poise and tan δ, of 1.16 at 190° C. and a tan δ vs. η* power-law exponent of −0.639 for the range of 190° C. to 230° C. The blend will form a foamable composition that is capable of producing a foam with a density as low as 17 kg/m$^3$ in a conventional foam extrusion process.

Inventive Example 5

The HDPE/PS/LLDPE resin blend ratio of Example 1 was changed from 33:33:33 to 80:10:10. The three-component polymeric blend is characterized by η* of 1.56×10$^5$ poise and tan δ, of 1.19 at 190° C. and a tan δ vs. η* power-law exponent of −0.482 for the range of 190° C. to 230° C. The blend will form a foamable composition that is capable of producing a foam with a density as low as 17 kg/m$^3$ in a conventional foam extrusion process.

Inventive Example 6

The HDPE/PS/LLDPE resin blend ratio of Example 1 was changed from 33:33:33 to 10:10:80. The three-component polymeric blend is characterized by $\eta^*$ of $6.46\times10^4$ poise and tan δ, of 1.16 at 190° C. and a tan δ vs. $\eta^*$ power-law exponent of −0.570 for the range of 190° C. to 230° C. The blend will form a foamable composition that is capable of producing a foam with a density as low as 17 kg/m$^3$ in a conventional foam extrusion process.

Inventive Example 7

The HDPE/PS/LLDPE resin blend ratio of Example 1 was changed from 33:33:33 to 10:80:10. The three-component polymeric blend is characterized by $\eta^*$ of $2.17\times10^5$ poise and tan δ, of 1.16 at 190° C. and a tan δ vs. $\eta^*$ power-law exponent of −0.652 for the range of 190° C. to 230° C. The blend will form a foamable composition that is capable of producing a foam with a density as low as 17 kg/m$^3$ in a conventional foam extrusion process.

Inventive Example 8

The HDPE resin in the resin blend Example 1 was changed from Atofina HL428 to HDPE resin recovered from one-gallon milk jugs from a local dairy in Eastern New York State. The recovered milk jugs has been cleaned and rinsed with distilled water. The recovered milk jug resin is characterized by $\eta^*$ of $8.61\times10^4$ poise and tan δ of 1.48 at 190° C. The three-component polymeric blend is characterized by $\eta^*$ of $1.10\times10^5$ poise and tan δ, of 1.21 at 190° C. and a tan δ vs. $\eta^*$ power-law exponent of −0.576 for the range of 190° C. to 230° C. The blend will form a foamable composition that is capable of producing a foam with a density as low as 17 kg/m$^3$ in a conventional foam extrusion process.

Inventive Example 9

The HDPE resin in the resin blend Example 1 was changed from Atofina HL428 to Atofina HL328, which is characterized by $\eta^*$ of $1.01\times10^5$ poise and tan δ of 1.63 at 190° C. The three-component polymeric blend is characterized by $\eta^*$ of $1.37\times10^5$ poise and tan δ, of 1.19 at 190° C. and a tan δ vs. $\eta^*$ power-law exponent of −0.558 for the range of 190° C. to 230° C. The blend will form a foamable composition that is capable of producing a foam with a density as low as 17 kg/m$^3$ in a conventional foam extrusion process.

Inventive Example 10

The Alkenyl Aromatic resin in the resin blend Example 1 was changed from Dow 685D crystal polystyrene to a High Impact Polystyrene recovered from lids that are normally used for foam coffee cups, but had not been used. The three-component polymeric blend is characterized by $\eta^*$ of $1.10\times10^5$ poise and tan δ, of 1.21 at 190° C. and a tan δ vs. $\eta^*$ power-law exponent of −0.576 for the range of 190° C. to 230° C. The blend will form a foamable composition that is capable of producing a foam with a density as low as 17 kg/m$^3$ in a conventional foam extrusion process.

Inventive Example 11

The Alkenyl Aromatic resin in the resin blend Example 1 was changed from Dow 685D crystal polystyrene to Phillips K-Resin KR-03, a styrene/butadiene copolymer. The three-component polymeric blend is characterized by $\eta^*$ of $9.96\times10^4$ poise and tan δ, of 1.09 at 190° C. and a tan δ vs. $\eta^*$ power-law exponent of −0.372 for the range of 190° C. to 230° C. The blend will form a foamable composition that is capable of producing a foam with a density as low as 17 kg/m$^3$ in a conventional foam extrusion process.

Inventive Example 12

The Alkenyl Aromatic resin in the resin blend Example 1 was changed from Dow 685D crystal polystyrene to Nova Dylark® 132, a styrene/maleic anhydride copolymer. The three-component polymeric blend is characterized by $\eta^*$ of $1.10\times10^5$ poise and tan δ, of 1.21 at 190° C. and a tan δ vs. $\eta^*$ power-law exponent of −0.576 for the range of 190° C. to 230° C. The blend will form a foamable composition that is capable of producing a foam with a density as low as 17 kg/m$^3$ in a conventional foam extrusion process.

Inventive Example 13

The LLDPE resin in the resin blend Example 1 was changed from Union Carbide DFDA-2207 to pieces of Glad® garbage bags. The plastic resin from the recovered pieces of Glad bags is characterized by $\eta^*$ of $1.01\times10^5$ poise and tan δ of 1.63 at 190° C. The three-component polymeric blend is characterized by $\eta^*$ of $1.09\times10^5$ poise and tan δ, of 1.30 at 190° C. and a tan δ vs. $\eta^*$ power-law exponent of −0.577 for the range of 190° C. to 230° C. The blend will form a foamable composition that is capable of producing a foam with a density as low as 17 kg/m$^3$ in a conventional foam extrusion process.

Inventive Example 14

The amount of the recovered milk jug HDPE of Example 8 was increased to change the HDPE/PS/LLDPE resin blend ratio from 33:33:33 to 60:20:20. The three-component polymeric blend is characterized by $\eta^*$ of $1.07\times10^5$ poise and tan δ, of 1.25 at 190° C. and a tan δ vs. $\eta^*$ power-law exponent of −0.504 for the range of 190° C. to 230° C. The blend will form a foamable composition that is capable of producing a foam with a density as low as 17 kg/m$^3$ in a conventional foam extrusion process.

Inventive Example 15

The amount of the Atofina HL328 HDPE of Example 9 was increased to change the HDPE/PS/LLDPE resin blend ratio from 33:33:33 to 60:20:20. The three-component polymeric blend is characterized by $\eta^*$ of $1.58\times10^5$ poise and tan δ, of 1.23 at 190° C. and a tan δ vs. $\eta^*$ power-law exponent of −0.461 for the range of 190° C. to 230° C. The blend will form a foamable composition that is capable of producing a foam with a density as low as 17 kg/m$^3$ in a conventional foam extrusion process.

Inventive Example 16

The amount of the lid High Impact Polystyrene of Example 10 was increased to change the HDPE/PS/LLDPE resin blend ratio from 33:33:33 to 20:60:20. The three-component polymeric blend is characterized by $\eta^*$ of $1.87\times10^5$ poise and tan δ, of 0.99 at 190° C. and a tan δ vs. $\eta^*$ power-law exponent of −0.504 for the range of 190° C. to 230° C. The blend will form a foamable composition that is

Inventive Example 17

The amount of the Phillips K-Resin KR-03 used in Example 11 was increased to change the HDPE/PS/LLDPE resin blend ratio from 33:33:33 to 20:60:20. The three-component polymeric blend is characterized by $\eta^*$ of $1.08 \times 10^5$ poise and tan $\delta$, of 1.03 at 190° C. and a tan $\delta$ vs. $\eta^*$ power-law exponent of −0.355 for the range of 190° C. to 230° C. The blend will form a foamable composition that is capable of producing a foam with a density as low as 17 kg/m³ in a conventional foam extrusion process.

Inventive Example 18

The amount of the Nova Dylark 132 styrene/maleic anhydride copolymer in Example 12 was increased to change the HDPE/PS/LLDPE resin blend ratio from 33:33:33 to 20:60:20. The three-component polymeric blend is characterized by $\eta^*$ of $2.15 \times 10^5$ poise and tan $\delta$, of 0.96 at 190° C. and a tan $\delta$ vs. $\eta^*$ power-law exponent of −0.694 for the range of 190° C. to 230° C. The blend will form a foamable composition that is capable of producing a foam with a density as low as 17 kg/m³ in a conventional foam extrusion process.

Inventive Example 19

The amount of linear low density polyethylene from the garbage bags of Example 13 was increased to change the HDPE/PS/LLDPE resin blend ratio from 33:33:33 to 20:20:60. The three-component polymeric blend is characterized by $\eta^*$ of $1.07 \times 10^5$ poise and tan $\delta$, of 1.25 at 190° C. and a tan $\delta$ vs. $\eta^*$ power-law exponent of −0.504 for the range of 190° C. to 230° C. The blend will form a foamable composition that is capable of producing a foam with a density as low as 17 kg/m³ in a conventional foam extrusion process.

Inventive Example 20

The LLDPE in Example 5 HDPE/PS/LLDPE blend ratio of 80:10:10 was changed from Union Carbide DFDA-2207 to Equistar GA502-024, which is a conventional LLDPE manufactured with a Ziegler-Natta catalyst. This resin is characterized by $\eta^*$ of $5.59 \times 10^4$ poise and tan $\delta$ of 5.18 at 190° C. The three-component polymeric blend is characterized by $\eta^*$ of $1.89 \times 10^5$ poise and tan $\delta$, of 1.18 at 190° C. and a tan $\delta$ vs. $\eta^*$ power-law exponent of −0.339 for the range of 190° C. to 230° C. The blend will form a foamable composition that is capable of producing a foam with a density as low as 17 kg/m³ in a conventional foam extrusion process.

Inventive Example 21

The LLDPE in Example 4 with the HDPE/PS/LLDPE blend ratio of 20:60:20 was changed from Union Carbide DFDA-2207 to Equistar GA502-024 as in Example 23. The three-component polymeric blend is characterized by $\eta^*$ of $1.32 \times 10^5$ poise and tan $\delta$, of 1.36 at 190° C. and a tan $\delta$ vs. $\eta^*$ power-law exponent of −0.303 for the range of 190° C. to 230° C. The blend will form a foamable composition that is capable of producing a foam with a density as low as 17 kg/m³ in a conventional foam extrusion process.

Inventive Example 22

The LLDPE in Example 1 with the HDPE/PS/LLDPE blend ratio of 33:33:33 was changed from Union Carbide DFDA-2207 to Equistar GA502-024 as in Example 23. The three-component polymeric blend is characterized by $\eta^*$ of $1.20 \times 10^5$ poise and tan $\delta$, of 1.59 at 190° C. and a tan $\delta$ vs. $\eta^*$ power-law exponent of −0.353 for the range of 190° C. to 230° C. The blend will form a foamable composition that is capable of producing a foam with a density as low as 17 kg/m³ in a conventional foam extrusion process.

Inventive Example 23

The amount of Equistar GA502-024 in Example 22 was increased to change the HDPE/PS/LLDPE blend ratio from 33:33:33 to 30:30:40. The three-component polymeric blend is characterized by $\eta^*$ of $1.26 \times 10^5$ poise and tan $\delta$, of 1.54 at 190° C. and a tan $\delta$ vs. $\eta^*$ power-law exponent of −0.400 for the range of 190° C. to 230° C. The blend will form a foamable composition that is capable of producing a foam with a density as low as 17 kg/m³ in a conventional foam extrusion process.

Inventive Example 24

The amount of Equistar GA502-024 in Example 23 was further increased to change the HDPE/PS/LLDPE blend ratio from 30:30:40 to 25:25:50. The three-component polymeric blend is characterized by $\eta^*$ of $9.65 \times 10^4$ poise and tan $\delta$, of 2.04 at 190° C. and a tan $\delta$ vs. $\eta^*$ power-law exponent of −0.342 for the range of 190° C. to 230° C. The blend will form a foamable composition that is capable of producing a foam with a density as low as 25 kg/m³ in a conventional foam extrusion process.

Comparative Example 25

The amount of Equistar GA502-024 in Example 23 was further increased to change the HDPE/PS/LLDPE blend ratio from 25:25:50 to 20:20:60. The three-component polymeric blend is characterized by $\eta^*$ of $7.14 \times 10^4$ poise and tan $\delta$, of 2.42 at 190° C. and a tan $\delta$ vs. $\eta^*$ power-law exponent of −0.313 for the range of 190° C. to 230° C. The blend will not produce a dimensionally stable foam in a conventional foam extrusion process.

Comparative Example 26

The amount of Equistar GA502-024 in Example 25 was further increased to change the HDPE/PS/LLDPE blend ratio from 20:20:60 to 16.7:16.7:66.6. The three-component polymeric blend is characterized by $\eta^*$ of $6.66 \times 10^4$ poise and tan $\delta$, of 2.69 at 190° C. and a tan $\delta$ vs. $\eta^*$ power-law exponent of −0.425 for the range of 190° C. to 230° C. The blend will not produce a dimensionally stable foam in a conventional foam extrusion process.

Comparative Example 27

The LLDPE in Example 6 with the HDPE/PS/LLDPE blend ratio of 10:10:80 was changed from Union Carbide DFDA-2207 to Equistar GA502-024 as in Example 23. The three-component polymeric blend is characterized by $\eta^*$ of $6.01 \times 10^4$ poise and tan $\delta$, of 3.47 at 190° C. and a tan $\delta$ vs. $\eta^*$ power-law exponent of −0.278 for the range of 190° C. to 230° C. The blend will not produce a dimensionally stable foam in a conventional foam extrusion process.

TABLE 1

Summary of Inventive Blend Rheological Properties

| Example | HDPE | Alkenyl Aromatic Polymer | LLDPE | η* | tan δ | Power-Law Exponent |
|---|---|---|---|---|---|---|
| 1 | 33.3% Atofina HL428 | 33.3% Dow 685 PS | 33.3% Union Carbide DFDA-2207 | 130000 | 1.17 | −0.607 |
| 2 | 60% Atofina HL428 | 20% Dow 685 PS | 20% Union Carbide DFDA-2207 | 144000 | 1.18 | −0.557 |
| 3 | 20% Atofina HL428 | 20% Dow 685 PS | 60% Union Carbide DFDA-2207 | 87100 | 1.16 | −0.590 |
| 4 | 20% Atofina HL428 | 60% Dow 685 PS | 20% Union Carbide DFDA-2207 | 174000 | 1.16 | −0.639 |
| 5 | 80% Atofina HL428 | 10% Dow 685 PS | 10% Union Carbide DFDA-2107 | 156000 | 1.19 | −0.482 |
| 6 | 10% Atofina HL428 | 10% Dow 685 PS | 80% Union Carbide DFDA-2107 | 64600 | 1.16 | −0.570 |
| 7 | 10% Atofina HL428 | 80% Dow 685 PS | 10% Union Carbide DFDA-2107 | 217000 | 1.16 | −0.652 |
| 8 | 33.3% Recovered Milk Jugs | 33.3% Dow 685 PS | 33.3% Union Carbide DFDA-2207 | 110000 | 1.21 | −0.576 |
| 9 | 33.3% Atofina HL328 | 33.3% Dow 685 PS | 33.3% Union Carbide DFDA-2207 | 137000 | 1.19 | −0.558 |
| 10 | 33.3% Atofina HL428 | 33.3% Recovered Foam Coffee Cup Lids | 33.3% Union Carbide DFDA-2207 | 135000 | 1.06 | −0.585 |
| 11 | 33.3% Atofina HL428 | 33.3% Phillips K-Resin ® KR-03 | 33.3% Union Carbide DFDA-2207 | 99600 | 1.09 | −0.372 |
| 12 | 33.3% Atofina HL428 | 33.3% Nova Dylark ® 132 | 33.3% Union Carbide DFDA-2207 | 146000 | 1.05 | −0.658 |
| 13 | 33.3% Atofina HL428 | 33.3% Dow 685 PS | 33.3% Recovered Glad ® Garbage Bag | 109000 | 1.30 | −0.577 |
| 14 | 60% Recovered Milk Jugs | 20% Dow 685 PS | 20% Union Carbide DFDA-2207 | 107000 | 1.25 | −0.504 |
| 15 | 60% Atofina HL328 | 20% Dow 685 PS | 20% Union Carbide DFDA-2207 | 158000 | 1.23 | −0.461 |
| 16 | 20% Atofina HL428 | 60% Recovered Foam Coffee Cup Lids | 20% Union Carbide DFDA-2207 | 187000 | 0.99 | −0.612 |
| 17 | 20% Atofina HL428 | 60% Phillips K-Resin ® KR-03 | 20% Union Carbide DFDA-2207 | 108000 | 1.03 | −0.355 |
| 18 | 20% Atofina HL428 | 60% Nova Dylark ® 132 | 20% Union Carbide DFDA-2207 | 215000 | 0.96 | −0.694 |
| 19 | 20% Atofina HL428 | 20% Dow 685 PS | 20% Recovered Glad ® Garbage Bag | 107000 | 1.25 | −0.504 |
| 20 | 80% Atofina HL428 | 10% Dow 685 PS | 10% Equistar GA502-024 | 189000 | 1.18 | −0.339 |
| 21 | 60% Atofina HL428 | 20% Dow 685 PS | 20% Equistar GA502-024 | 132000 | 1.36 | −0.303 |
| 22 | 33.3% Atofina HL428 | 33.3% Dow 685 PS | 33.3% Equistar GA502-024 | 120000 | 1.59 | −0.353 |
| 23 | 30% Atofina HL428 | 30% Dow 685 PS | 40% Equistar GA502-024 | 126000 | 1.54 | −0.400 |
| 24 | 25% Atofina HL428 | 25% Dow 685 PS | 50% Equistar GA502-024 | 96500 | 2.04 | −0.342 |

TABLE 2

Summary of Comparative Blend Rheological Properties

| Example | HDPE | Alkenyl Aromatic Polymer | LLDPE | η* | tan δ | Power-Law Exponent |
|---|---|---|---|---|---|---|
| 25 | 20% Atofina HL428 | 20% Dow 685 PS | 60% Equistar GA502-024 | 71400 | 2.42 | −0.313 |
| 26 | 16.7% Atofina HL428 | 16.7% Dow 685 PS | 66.7% Equistar GA502-024 | 66600 | 2.69 | −0.425 |
| 27 | 10% Atofina HL428 | 10% Dow 685 PS | 80% Equistar GA502-024 | 60100 | 3.47 | −0.278 |

Table 1 summarizes the rheological values of the complex viscosity (η*) and the loss tangent (tan δ) and the tan δ vs. η* Power-Law Exponent that was determined for the foamable inventive blends indicated in the Examples. Table 2 similarly summarizes information for certain blends that would not produce a polymeric foam in a conventional foam extrusion process.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A process for preparing a polymeric foam, the process comprising:

(a) melting a high density polyethylene, an alkenyl aromatic polymer and a linear low density polyethylene to form a polymeric composition, the polymeric composition comprising from about 5 to 85 weight percent of high density polyethylene, from about 5 to about 85 weight percent of alkenyl aromatic polymer and from about 5 to about 85 weight percent of the linear low density polyethylene and characterized by Dynamic Mechanical Spectroscopy using a frequency of 1.00 radians/sec and 25 mm parallel plates with a 1.00 mm gap to have a complex viscosity (η*) in the range of $6.0 \times 10^4$ to $2 \times 10^5$ poise and loss tangent (tan δ) in the range of 0.7 to 2.1 at 190° C., and a power-law relation between tan δ and η* where the exponent is within the range between −0.70 and −0.35 for the temperature range of 190° to 230° C., (b) adding a nucleating agent to the polymeric composition;

(c) dissolving an effective amount of blowing agent;

(d) transferring the mixture of step (c) to an expansion zone; and (e) permitting the mixture of step (d) to expand in the expansion zone to produce the polymeric foam.

2. The process of claim 1, wherein the nucleating agent is selected from the group consisting of talc, crystalline silica, and a mixture of citric acid and sodium bicarbonate.

3. The process of claim 2, wherein the nucleating agent is talc.

4. The process of claim 1, wherein the blowing agent is chosen from the group consisting of methane, ethane, propane, n-butane, isobutane, n-pentane, isopentane, and blends thereof.

5. The process of claim 4, wherein the blowing agent is chosen from the group of n-butane, isobutane and blends thereof.

6. The process of claim 1, further including the step of adding a stability control agent before step (d).

7. The process of claim 6, wherein the stability control agent is glycerol monostearate.

8. A polymeric foam formed by the process of claim 1.

9. The process of claim 1, wherein the high density polyethylene is from about 30 to about 40 weight percent, the alkenyl aromatic polymer is from about 30 to about 40 weight percent, and the linear low density polyethylene is from about 30 to about 40 weight percent.

10. The process of claim 9 wherein the polymeric composition is characterized by Dynamic Mechanical Spectroscopy using a frequency of 1.00 radians/sec and 25 mm parallel plates with a 1.00 mm gap to have a complex viscosity ($\eta^*$) in the range of $9.0 \times 10^4$ to $1.6 \times 10^5$ poise and loss tangent (tan $\delta$) in the range of 0.9 to 1.5 at 190° C., and a power-law relation between tan $\delta$ and $\eta^*$ where the exponent is within the range between −0.65 and −0.54 for the temperature range of 190° to 230° C.

11. The process of claim 1, wherein the high density polyethylene is from about 50 to about 80 weight percent, the alkenyl aromatic polymer is from about 10 to about 25 weight percent, and the linear low density polyethylene is from about 10 to about 25 weight percent.

12. The process of claim 1, wherein the high density polyethylene is from about 10 to about 25 weight percent, the alkenyl aromatic polymer is from about 10 to about 25 weight percent, and the linear low density polyethylene is from about 50 to about 80 weight percent.

13. The process of claim 1, wherein the high density polyethylene is from about 10 to about 25 weight percent, the alkenyl aromatic polymer is from about 50 to about 80 weight percent, and the linear low density polyethylene is from about 10 to about 25 weight percent.

14. The process of claim 1, wherein the high density polyethylene is selected from the group consisting of prime virgin HDPE, offgrade virgin HDPE, reclaimed post-industrial HDPE, reclaimed post-consumer HDPE, or blends thereof.

15. The process of claim 14, wherein the high density polyethylene is characterized by a complex viscosity ($\eta^*$) in the range of $7.0 \times 10^4$ to $2.2 \times 10^5$ poise and loss tangent (tan $\delta$) in the range of 0.9 to 3.0 at 190° C., and a power-law relationship between tan $\delta$ and $\eta^*$ where the exponent is in the range of −0.45 and −0.25 for the temperature range of 190° C. to 230° C.

16. The process of claim 1, wherein the alkenyl aromatic polymer is selected from the group consisting of prime virgin alkenyl aromatic polymer, offgrade virgin alkenyl aromatic polymer, reclaimed post-industrial alkenyl aromatic polymer, reclaimed post-consumer alkenyl aromatic polymer, or blends thereof.

17. The process of claim 1, wherein the linear low density polyethylene is selected from the group consisting of prime virgin LLDPE, offgrade virgin LLDPE, reclaimed post-industrial LLDPE, reclaimed post-consumer LLDPE, or blends thereof.

18. The process of claim 17, wherein the linear low density polyethylene is characterized by a complex viscosity ($\eta^*$) in the range of $1.0 \times 10^4$ to $1.0 \times 10^5$ poise and loss tangent (tan $\delta$) in the range of 0.6 to 8.0 at 190° C.

19. The process of claim 18, wherein the linear low density polyethylene is characterized by a complex viscosity ($\eta^*$) in the range of $3.0 \times 10^4$ to $8.0 \times 10^4$ poise and loss tangent (tan $\delta$) in the range of 0.9 to 2.5 at 190° C.

20. The process of claim 1 further including the step of adding at least one additive before step (d).

21. The process of claim 20, wherein the at least one additive is selected from the group consisting of antistatics, coloring agents, fire retardants, antioxidants and plasticizers.

* * * * *

UNITED STATES PATENT AND TRADEMARK OFFICE
CERTIFICATE OF CORRECTION

PATENT NO.         : 7,226,956 B2                                          Page 1 of 1
APPLICATION NO.    : 10/880973
DATED              : June 5, 2007
INVENTOR(S)        : Wilkes et al.

It is certified that error appears in the above-identified patent and that said Letters Patent is hereby corrected as shown below:

Title Page (57) Abstract:

In line 7 of the abstract, insert -- . -- after the word "thereof".

Claim 1, column 22, line 51,

Delete: "$6.0 \times 10^4$ to $2 \times 10^5$" and insert: -- $6.0 \times 10^4$ to $2.5 \times 10^5$ --

Signed and Sealed this

Seventh Day of August, 2007

JON W. DUDAS
*Director of the United States Patent and Trademark Office*